(12) United States Patent
da Costa et al.

(10) Patent No.: US 11,885,028 B2
(45) Date of Patent: Jan. 30, 2024

(54) METHOD OF SELECTIVELY INTERRUPTING A PASSIVE CATHODIC PROTECTION UNIT FROM A METALLIC STRUCTURE

(71) Applicant: Mobiltex Data Ltd., Calgary (CA)

(72) Inventors: Antonio Laranjo da Costa, Calgary (CA); Lucas Kiese Holzen, Calgary (CA); Philip James Daum, Calgary (CA)

(73) Assignee: Mobiltax Data Ltd., Calgary (CA)

( * ) Notice: Subject to any disclaimer, the term of this patent is extended or adjusted under 35 U.S.C. 154(b) by 0 days.

(21) Appl. No.: 18/053,672

(22) Filed: Nov. 8, 2022

(65) Prior Publication Data

US 2023/0070863 A1   Mar. 9, 2023

Related U.S. Application Data

(62) Division of application No. 16/869,138, filed on May 7, 2020, now Pat. No. 11,753,729.

(51) Int. Cl.
    *C23F 13/04*   (2006.01)
    *C23F 13/06*   (2006.01)
    *G05B 15/02*   (2006.01)

(52) U.S. Cl.
    CPC .............. *C23F 13/04* (2013.01); *C23F 13/06* (2013.01); *G05B 15/02* (2013.01)

(58) Field of Classification Search
    CPC .................. C23F 13/04; C23F 13/22; C23F 2213/10–2213/11
    See application file for complete search history.

(56) References Cited

U.S. PATENT DOCUMENTS

| | | | | |
|---|---|---|---|---|
| 4,356,444 A | * | 10/1982 | Saenz, Jr. | ............... C23F 13/22 324/559 |
| 6,992,594 B2 | * | 1/2006 | Dudley | .................. C23F 13/04 340/870.07 |
| 7,027,957 B2 | * | 4/2006 | Fourie | ................ G01R 31/3275 324/424 |
| 8,030,951 B2 | * | 10/2011 | Peters | ..................... C23F 13/04 324/700 |
| 2011/0238347 A1 | * | 9/2011 | Gemperli | ................ C23F 13/22 702/65 |

\* cited by examiner

*Primary Examiner* — Alexander W Keeling
(74) *Attorney, Agent, or Firm* — HARTMAN GLOBAL IP LAW; Gary M. Hartman; Domenica N.S. Hartman

(57) ABSTRACT

A method for changing an activation state of an interruption module for selectively interrupting at least one passive cathodic protection unit from a metallic structure. The method includes enabling a global positioning system (GPS) receiver in data communication with a controller of the interruption module, receiving GPS time via the GPS receiver from at least one global positioning system satellite in data communication therewith, synchronizing a real-time clock time of a real-time clock in data communication with the controller to GPS time, disabling the GPS receiver and changing the activation state of the interruption module if a predetermined activation state change time of the interruption module is between the local real-time clock time and the GPS time.

9 Claims, 9 Drawing Sheets

METHOD OF SELECTIVELY INTERRUPTING A PASSIVE CATHODIC PROTECTION UNIT FROM A METALLIC STRUCTURE

CROSS REFERENCE TO RELATED APPLICATIONS

This is a divisional patent application of U.S. patent application Ser. No. 16/869,138 filed May 7, 2020, the contents of which are incorporated herein by reference.

FIELD

The present invention relates to cathodic protection systems and more specifically to monitoring cathodic protection systems for metallic structures embedded in electrolytic media.

BACKGROUND

Metallic objects embedded in electrolytic media are generally subject to corrosion. Corrosion is a natural process which converts a refined metal into a more chemically stable form such as an oxide, hydroxide or sulfide. Corrosion is a deterioration and destruction of the material making up the metallic object and is caused by electrochemical reactions between the material making up the metallic object and its electrolytic media environment. Moisture, material composition, pH, temperature and polarization are some of the factors which may influence the rate of corrosion of the metallic structure.

Metallic objects such as pipelines embedded in electrolytic media such as soil are subject to corrosive electrochemical forces. Pipeline corrosion can result in damage, which is costly to repair, and which is potentially hazardous to the operation of the pipeline itself. Corroded pipelines can be subject to failure or contamination which can result in release of potentially hazardous materials into the natural environment.

Galvanic corrosion occurs on pipelines when two different metals are placed in physical or electrical contact with each other and are immersed in the soil. The more active metal, called the "anode", corrodes at a faster rate and the more stable metal, called the "cathode", corrodes at a slower rate.

One method for protecting against pipeline corrosion includes cathodic protection. Cathodic protection (CP) makes the metal structure to be protected, in this case the pipeline, the cathode of an electrochemical cell. This may be done, for example, by connecting the pipeline to a metal object or structure which is more easily corroded to act as the anode of the electrochemical cell. Thereby, the more easily corroded metal becomes a "sacrificial anode". Galvanic sacrificial anodes may be made, for example, from Zinc, Magnesium or Aluminum. These types of systems are known as "passive systems".

In "impressed current" systems, the cathodic protection system may include currents applied from an external power source, such as a rectifier. The rectifier is connected to the pipeline and one or more anodes. Current is passed from the rectifier to the pipeline to provide cathodic protection. Electrons leaving the anode are received by the rectifier. This reduces or eliminates consumption of the anodes in the cathodic protection system. A plurality of cathodic protection rectifiers to be located along the pipeline to apply a protection current there along. Rectifiers in impressed current systems may draw their power from line power, solar panels, wind generators, batteries for storing energy therefrom, or thermoelectric generators, to name a few. Rectifier systems which use batteries typically rely on another power source, such as solar panels, to "top up" the battery as it is depleted.

Between the passive cathodic protection systems and the impressed current cathodic protection systems, the passive cathodic protection systems, or galvanic protection, are easier to install, tend to be more cost-effective and are more energy efficient as they do not require external power.

To provide consistent protection, the electrochemical exchange between cathode and anode, or the pipeline structure and the cathodic protection system, must be maintained in balance. Over-application of cathodic protection can result in damage to pipeline coatings or hydrogen embrittlement, for example. Too little protection and the pipeline structure will still be subject to corrosion. Accordingly, once they are in place, the level of cathodic protection must be periodically tested to monitor performance of the cathodic protection system.

Methods for assessing the performance of the cathodic protection system include obtaining measurements of potential between the cathodically protected pipeline metal structure and a reference electrode. This allows for measurement of the "pipe-to-soil" potential, which is the potential difference generated between the pipeline and its surrounding soil. This potential difference is the result of electrolytic action and a cause of corrosion of the pipeline. Accordingly, pipe-to-soil potential is important for evaluating the corrosive conditions of the environment or for evaluating the extent of cathodic protection being applied.

One tool for assessing the performance of a cathodic protection system is a reference electrode. A reference electrode, or "half-cell" is a stable electrode having known potential. The purpose of a reference electrode is to allow for determination of the potential of the other electrode or "half" of the electrochemical cell. One common type of reference electrode is the copper/copper sulfate (CSE) electrode.

Pipe-to-soil potential is typically measured at one or more test stations along the pipeline. Each test station is electrically connected to the pipeline by a test cable. Thereby, the potential of the pipeline may be measured from the test station. The reference electrode may be placed in the soil in the vicinity of the protected pipeline. A voltmeter is connected between the test station and the reference electrode, with its negative terminal connected to the terminal of the reference electrode and the positive terminal connected to the test station. Thereby, a galvanic cell is created by connecting the two "half-cells" together, the first half being the natural half-cells formed between the pipeline and the soil and the second half-cell being the reference electrode. Accordingly, the voltage between the buried pipeline and the surrounding soil, or pipe-to-soil potential, may be measured.

However, in some environments, measuring pipe-to-soil potential accurately can be challenged by other currents in the soil. Sources of such other currents include nearby electric trains, other cathodic protection systems, power lines, welding or telluric current, for example. Accordingly, it is beneficial to electrically isolate the cathode or pipeline just prior to measuring the pipe-to-soil potential.

One tool for electrically isolating the cathode at the time of pipe-to-soil potential measurement is the cathodic protection (CP) coupon. A CP coupon can also be used to determine the corrosion rate of the material making up the pipeline. Coupons are an uncoated sample of the same material used to fabricate the pipeline and are typically weighed and measured prior to burial adjacent to the pipeline structure. The coupon is electrically connected to the pipeline by wire, for example. The coupon simulates an uncoated portion of the pipeline also known as a "holiday".

For monitoring of cathodic protection potential, the connection between the coupon and the pipeline structure is instantaneously interrupted or is interrupted nearly-instantaneously. Similarly, the reference electrode is preferably placed in a tube to eliminate any potential drop in the soil during measurement. Thereby, the polarized potential of the coupon can be measured with respect to the reference electrode placed in the tube. If the polarized potential of the coupon is indicative of adequate cathodic protection, then any unprotected pipeline structure of the same size or smaller should be equally protected.

The use of CP coupons for measuring pipe-to-soil potential is beneficial as the potential of the pipeline structure can be inferred from the coupon, adequate cathodic protection can be confirmed without the need to interrupt all sources of current in the vicinity of the pipeline, readings will be free of potential drop and can also be used to detect hazardous voltages.

Corrosion is unlikely where a measured AC current density of the coupon is 0 to 20 A/m2. AC corrosion is unpredictable where the AC current density is 20 A/m2 to 100 A/m2 and is likely at greater than 100 A/m2.

The cathodic protection monitoring system is deployed at various points in preferably all along the pipeline and related structures. Accordingly, the cathodic protection monitoring system includes a plurality of test stations. Due to the length of pipelines, which can stretch hundreds of kilometers, the test stations are geographically dispersed. It is preferable to take measurements at each test station simultaneously. Accordingly, the interruption of the circuit between the buried coupon in the cathodic protection system must be synchronized at each station. Previous systems which rely on such synchronization typically have sources of external power. Such as impressed current rectifier systems for example. However, there is a desire to provide a passive system which provides the advantages associated with synchronized interruption along with reduced demands for power.

SUMMARY

The present invention relates to cathodic protection systems and more specifically to monitoring cathodic protection systems for metallic structures embedded in electrolytic media.

Cathodic protection may be applied to a variety of suitable metallic structures. Metallic structures suitable for cathodic protection system as described herein may include, by way of non-limiting example, marine structures, storage tanks, bridges, power line towers or other electrical grid infrastructure and pipelines for conveying fluids such as oil, water or gas. Accordingly, the electrolytic media may also take a variety of suitable forms depending on the environment within which the metallic structure resides. The cathodic protection system is described herein within the context of a preferred aspect wherein the metallic structure is a pipeline, such as an oil pipeline, and the electrolytic media is soil within which the pipeline is embedded. However, it should be understood that the present invention is not limited to this preferred aspect and may be applicable to other metallic structures is other electrolytic media environments.

In one aspect, there is provided a cathodic protection interruption system including a metallic structure embedded in an electrolytic medium, a plurality of passive cathodic protection units embedded in the electrolytic medium adjacent to and spaced apart along the metallic structure, a plurality of test units electrically coupled with the metallic structure and each of the plurality of passive cathodic protection units, and, a low-power consumption component arrangement. The low-power consumption component arrangement includes a local real-time clock coupled with each test unit of the plurality of test units and a global positioning system (GPS) receiver coupled with each test unit of the plurality of test units for receiving GPS time from at least one global positioning system satellite in data communication therewith. The low-power consumption component arrangement further includes at least one controller communicatively coupled with each real-time clock and each GPS receiver for activating the GPS receiver once the local real-time clock reaches a predetermined real-time clock time to synchronize a real-time clock time of each local real-time clock with GPS time, and, a plurality of interruption modules each coupled in electrical and data communication with the at least one controller. The at least one controller may selectively change an activation state of each interruption module of the plurality of interruption modules once the real-time clock time reaches a predetermined activation state change time to selectively electrically couple or electrically decouple each passive cathodic protection unit of the plurality of passive cathodic protection units from the metallic structure. In one aspect, the real-time clock is a digital temperature-compensated crystal oscillator (DTCXO). Ones of the passive cathodic protection units of the plurality of passive cathodic protection units are selected from the group consisting of bonds and sacrificial anodes. The GPS receiver may be deactivated after synchronization until the real-time clock reaches the predetermined real-time clock time. In one aspect, a local power source may be electrically coupled with at least one of the test stations and the interruption module. The local power source may be a battery absent external augmentation The metallic structure may be one of a pipeline, a marine structure, a storage tank, a bridge, a power line tower, an electrical grid infrastructure component and a coupon. The electrolytic medium is at least one of soil and water.

A plurality of reference electrodes may each be embedded in the electrolytic medium proximate to the metallic structure and electrically coupled with a corresponding test unit of the plurality of test units. The system may include a plurality of voltmeters wherein one voltmeter of the plurality of voltmeters is electrically coupled between each reference electrode and corresponding test unit of the plurality of test units.

The system may include a plurality of remote monitoring units each housing a corresponding one of the at least one interruption modules and in electrical communication and data communication with a corresponding test unit of the plurality of test units. Each remote monitoring unit of the plurality of remote monitoring units may be configured for wireless cellular communication or may be configured for wireless satellite communication. A battery may serve as a sole power source for at least one of the remote monitoring unit and the corresponding test station. The battery may be absent connection with an external power source.

At least one low earth orbit L-band satellite may be in data communication with each remote monitoring unit of the plurality of remote monitoring units.

In another aspect, at least one coupon may be embedded in the electrolytic medium adjacent the metallic structure and electrically coupled with the at least one cathodic protection unit via the test station. A switch may be electrically coupled between the at least one coupon and the test station for selectively coupling and decoupling the at least one coupon from the at least one cathodic protection unit.

In another aspect, there is provided a cathodic protection interruption system including a metallic structure embedded in an electrolytic medium, at least one passive cathodic protection unit embedded in the electrolytic medium adjacent to the metallic structure, a test unit electrically coupled with the metallic structure and the passive cathodic protection unit, and a low-power consumption component arrangement. The low-power consumption component arrangement includes a local real-time clock coupled with the test unit and a global positioning system (GPS) receiver coupled with the test unit for receiving GPS time from at least one global positioning system satellite in data communication therewith, at least one controller communicatively coupled with the real-time clock and the GPS receiver for activating the GPS receiver once the local real-time clock reaches a predetermined local time to synchronize the local real-time clock with GPS time, and an interruption module coupled in electrical and data communication with the at least one controller. The at least one controller may selectively change an activation state of the interruption module once the real-time clock time has reached a predetermined activation state change time to selectively electrically couple or electrically decouple the passive cathodic protection unit from the metallic structure.

In another aspect there is provided a method for changing an activation state of an interruption module for selectively interrupting at least one passive cathodic protection unit from a metallic structure. The method includes the steps of enabling a global positioning system (GPS) receiver in data communication with a controller of the interruption module, receiving GPS time via the GPS receiver from at least one global positioning system satellite in data communication therewith, synchronizing a real-time clock time of a real-time clock in data communication with the controller to GPS time, disabling the GPS receiver and changing the activation state of the interruption module if a predetermined activation state change time of the interruption module is between the local real-time clock time and the GPS time. The method may further include the step of enabling the GPS receiver upon expiry of the predetermined time period.

The step of disabling the GPS receiver may further include disabling the GPS receiver for a predetermined time period.

The step of synchronizing the real-time clock with GPS time may further include synchronizing the real-time clock with GPS time when the real-time clock leads GPS time.

In one aspect, the predetermined activation state change time may be a predetermined activation time and the interruption module may be activated at the step of changing the activation state. In another aspect, the predetermined activation state change time may be a predetermined de-activation time and the interruption module is de-activated at the step of changing the activation state.

In another aspect, prior to the step of receiving GPS time via the GPS receiver, the method may further include the step of establishing a data communication lock between the GPC receiver and the at least one global positioning system satellite.

The metallic structure may be one of a pipeline, a marine structure, a storage tank, a bridge, a power line tower, an electrical grid infrastructure component and a coupon. In one aspect, the metallic structure is a coupon which is embedded in the electrolytic medium adjacent the pipeline and electrically coupled with the passive cathodic protection unit via a switch electrically coupled between the coupon and the test station for selectively coupling and decoupling the at least one coupon from the passive cathodic protection unit.

DETAILED DESCRIPTION

The present invention relates to cathodic protection systems and more specifically to monitoring cathodic protection systems for metallic structures embedded in electrolytic media.

Cathodic protection may be applied to a variety of suitable metallic structures. Metallic structures suitable for cathodic protection system as described herein may include, by way of non-limiting example, marine structures, storage tanks, bridges, power line towers or other electrical grid infrastructure and pipelines for conveying fluids such as oil, water or gas. Accordingly, the electrolytic media may also take a variety of suitable forms depending on the environment within which the metallic structure resides. The cathodic protection system is described herein within the context of a preferred aspect wherein the metallic structure is a pipeline, such as an oil pipeline, and the electrolytic media is soil within which the pipeline is embedded. However, it should be understood that the present invention is not limited to this preferred aspect and may be applicable to other metallic structures is other electrolytic media environments.

Figure 1:
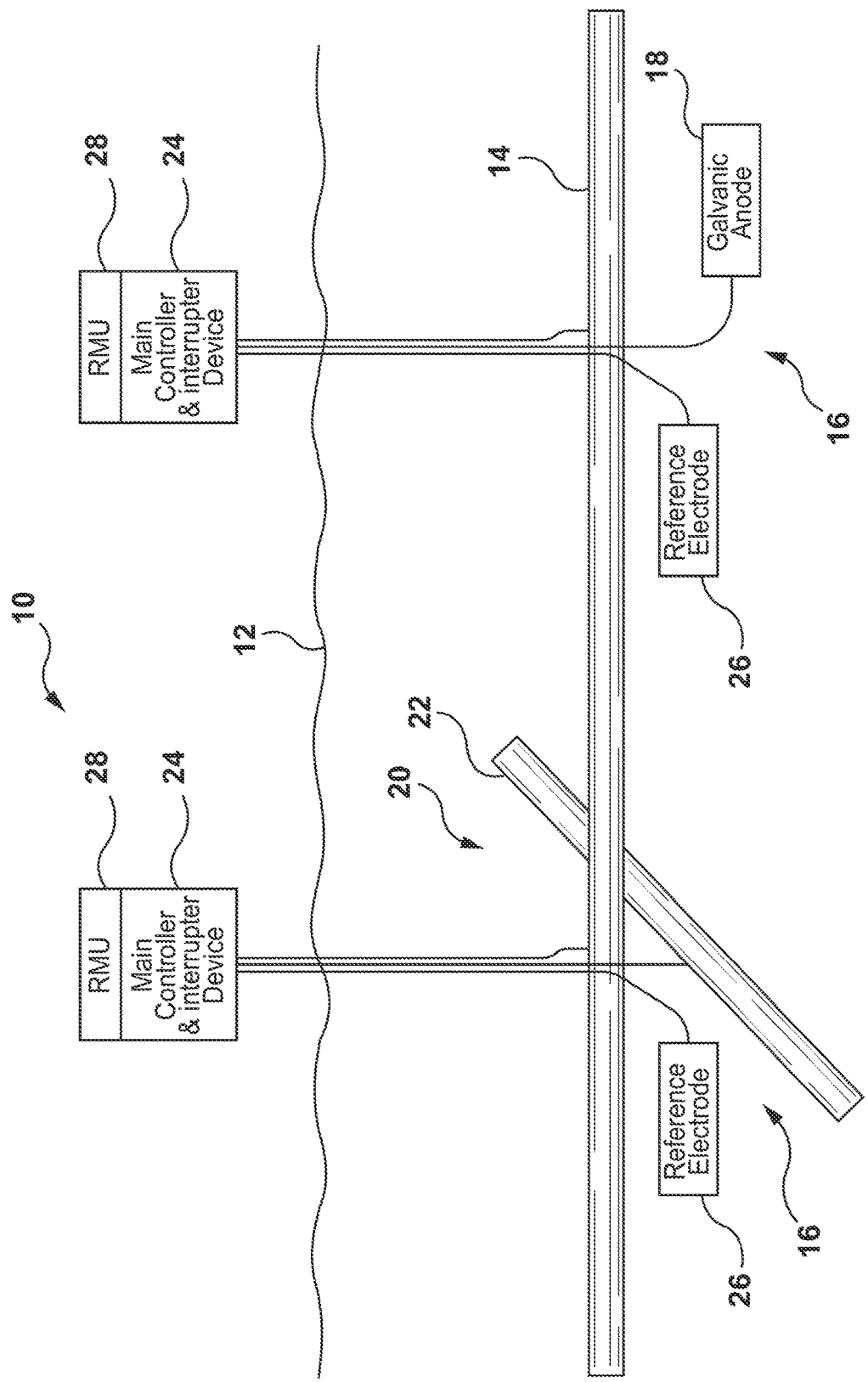
FIG. 1 illustrates a cathodic protection system in accordance with embodiments of the present invention.

With reference to the aspect illustrated in FIG. 1, there is shown a monitoring system 10 for monitoring a cathodic protection (CP) system 16 for applying cathodic protection to a structure embedded or buried in an electrolytic medium, such as a pipeline 14 buried in soil 12. To provide cathodic protection to the pipeline 14, the cathodic protection system 16 may include one or more passive cathodic protection units such as one or more sacrificial galvanic anodes 18 embedded in the soil 12 adjacent the pipeline 14 and spaced apart there along. With respect to sacrificial anodes, a metal which is more reactive than the metal making up the pipeline 14 is connected to the pipeline 14. The more reactive metal makes up the anode of an electrochemical cell and the pipeline 14 makes up the cathode of the electrochemical cell. Thereby, the sacrificial anode 18 is consumed and the pipeline 14 is protected from corrosion.

In another aspect, the cathodic protection system 16 may provide cathodic protection to the pipeline 14 via passive cathodic protection units such as one or more bonds 20. Cathodic protection systems in structures adjacent the pipeline 14 may interfere electrically with the cathodic protection of the pipeline 14. Currents produced within the environment by other cathodic protection systems can flow between the pipeline 14 and other secondary structures, such as the secondary pipeline 22. To control such currents, the pipeline 14 may be bonded by electrical connection to the secondary structure, in this case secondary pipeline 22. Such bonding balances the potential difference between the primary pipeline structure 14 and the secondary pipeline structure 22 and also controls the path of stray currents. Bonding not only provides for corrosion protection, but also reduces interference of measurements made while testing or monitoring cathodic protection system 16.

It should be understood that bonds 20 and sacrificial galvanic anodes 18 may be used contemporaneously on the same pipeline structure or suitability may determine which means for cathodic protection is deployed.

The monitoring system 10 may also include at least one above ground testing station 24 electrically coupled to the pipeline 14 and cathodic protection system 16, including the galvanic anode 18 or the bonded secondary structure 22 as the case may be. The testing stations 24 are also electrically coupled with a reference electrode 26 which will be discussed in further detail hereinafter.

Each testing station 24 may have coupled thereto a remote monitoring unit (RMU) 28 which is in electrical communication and data communication therewith. The testing station 24 is also configured for automated testing and monitoring of the cathodic protection applied to the pipeline 14 at various locations, some of which may be geographically remote and/or difficult to access by personnel for in-person testing and monitoring. The remote monitoring unit 28 provides for storage of data obtained from the testing station 24 and also provides for transmission of the data to a remote location and reception of information and commands from a remote location as will also be discussed further hereinafter.

Figure 2:
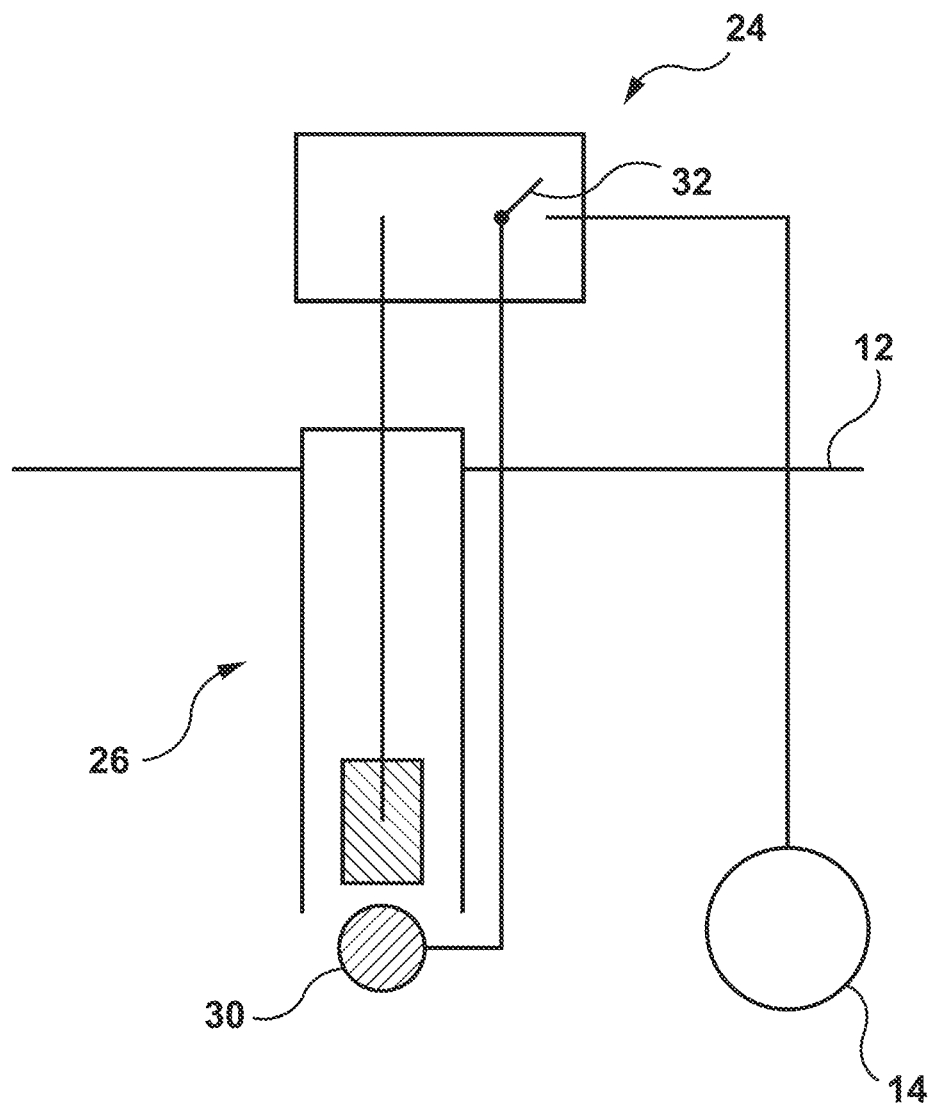
FIG. 2 illustrates a cathodic protection system using a coupon.

As shown in FIG. 2, the monitoring system 10 may include a coupon 30 adjacent the pipeline 14. A coupon is typically an uncoated piece of the material used to make up the pipeline 14. The coupon 30 simulates a bare spot or "holiday" of similar size on the pipeline 14. Coupon 30 is used for measurement of the performance of the cathodic protection system 16. Coupon 30 is selectively in electrical connection with the pipeline 14 via a switch 32 within the testing unit 24 for interrupting the connection between the coupon 30 and the cathodic protection system 16 coupled with the pipeline 14.

Figure 3:
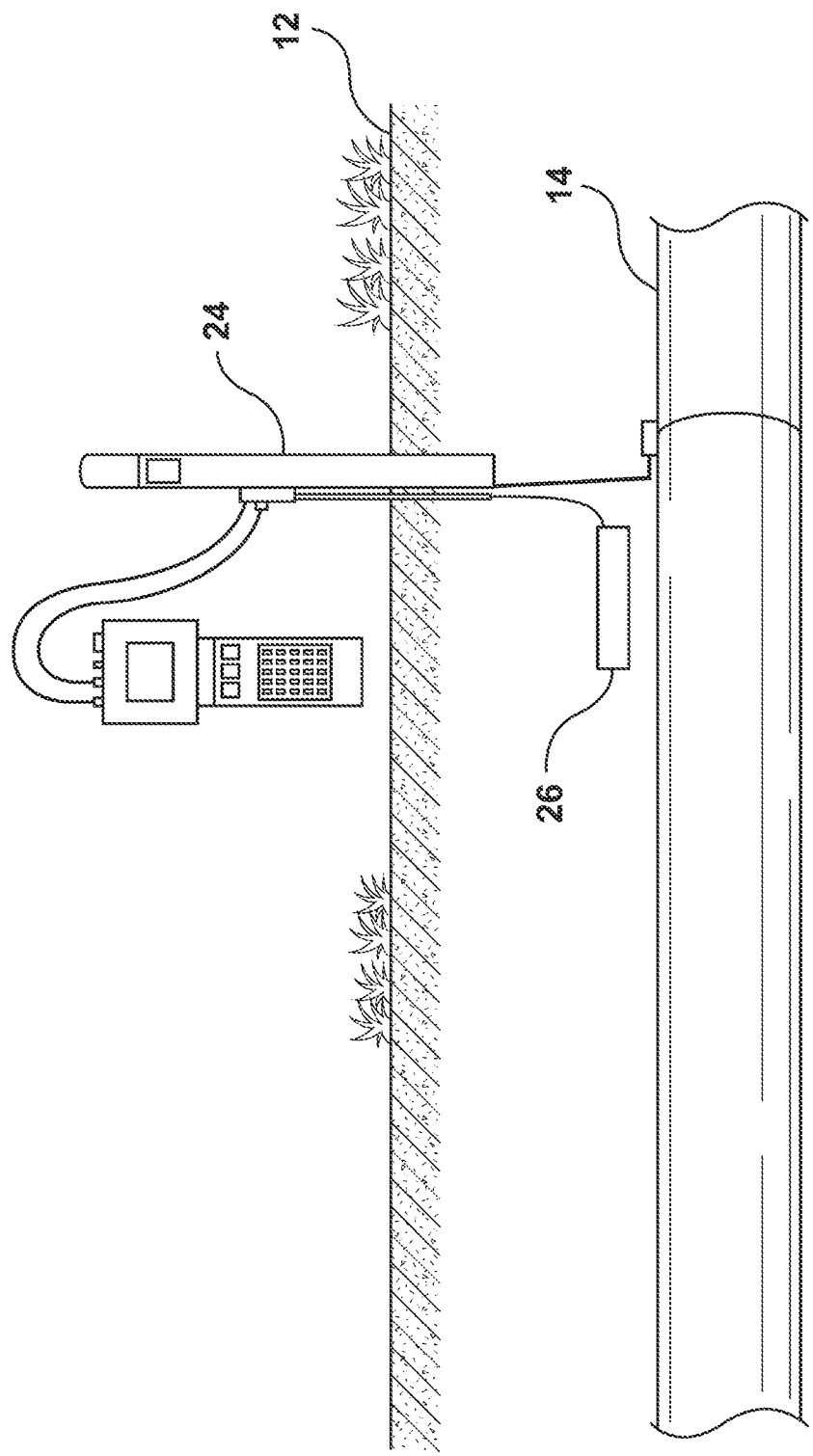
FIG. 3 illustrates a rectifier coupled with a test station and a reference electrode.

Test stations 24 are preferably placed at regular intervals along the pipeline 14 for testing corrosion severity along the pipeline 14. Each test station 24 is configured to read pipe-to-soil potentials or voltages with the use of coupon 30 and a reference electrode 26, which is preferably embedded in close proximity of pipeline 14, as shown in FIG. 3. Reference cell 26 is used as one half of an electrochemical cell, in this instance the anode, to determine the cell potential of the other half of the electrochemical cell, in this case the cathode. When measuring the potential, coupon 30 is electrically disconnected from the pipeline 14 via switch 32, and so coupon 30 forms an electrochemical cell with reference electrode 26. Pipe-to-soil potential is the voltage potential generated between the buried pipeline 14 and its surrounding soil 12 and is a cause of electrolytic corrosion of the pipeline 14. Accordingly, measurements of pipe-to-soil potential difference taken using the coupon 30 and the reference electrode 26 provide a measurement of the severity of corrosive activity along the pipeline 14.

Figure 4:
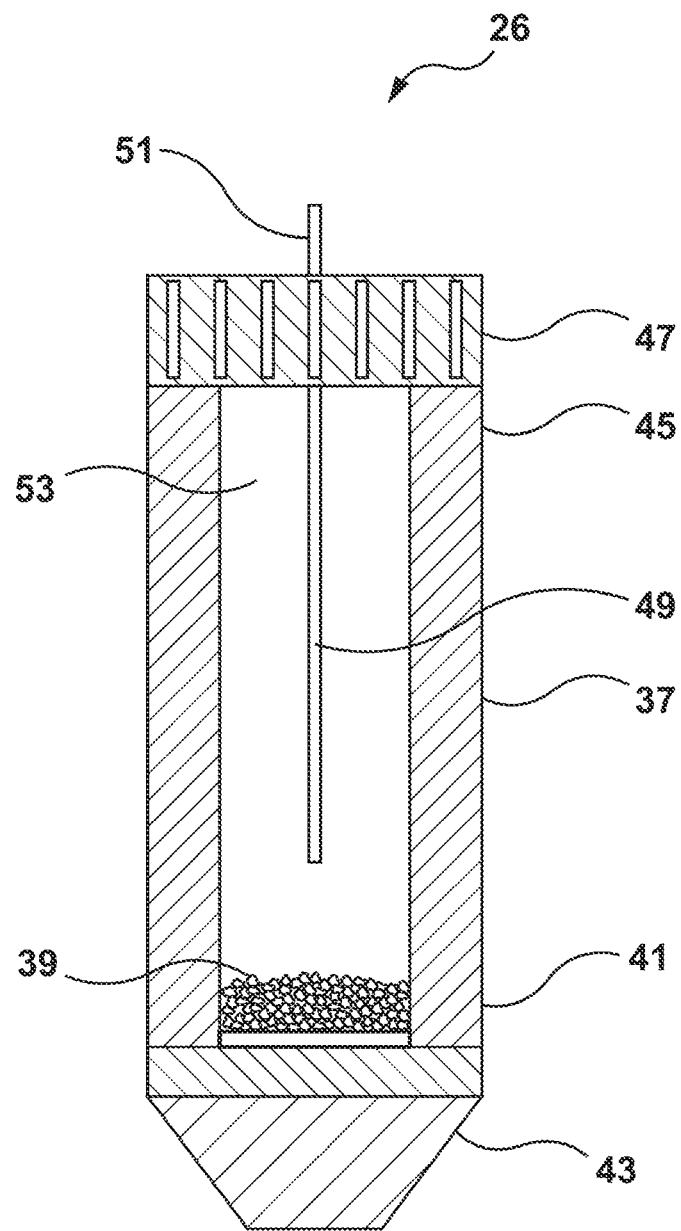
FIG. 4 illustrates a reference electrode.

FIG. 4 illustrates reference electrode 26 in further detail. The reference electrode 26 includes a tube or can 37 within which is a material 39 having a known electrode potential. At a first end portion 41 thereof, the tube 37 is plugged by plug 43 which is preferably of a porous material. At a second end portion 45 thereof, the tube 37 has a cap 47 which is preferably removable for selectively closing and opening the tube 37. Extending from the cap 47 into the tube 37 is a rod 49 which is preferably composed of a pure, electrically conductive material. There is also provided a connection 51 for connection to the testing station 24. Connection 51 is electrically connected with the rod 49 through an aperture (not shown) in the cap 47. Tube 37 may also have an inspection window 53 so that the interior of the tube 36 may be observed from the exterior, if desired.

Figure 5:
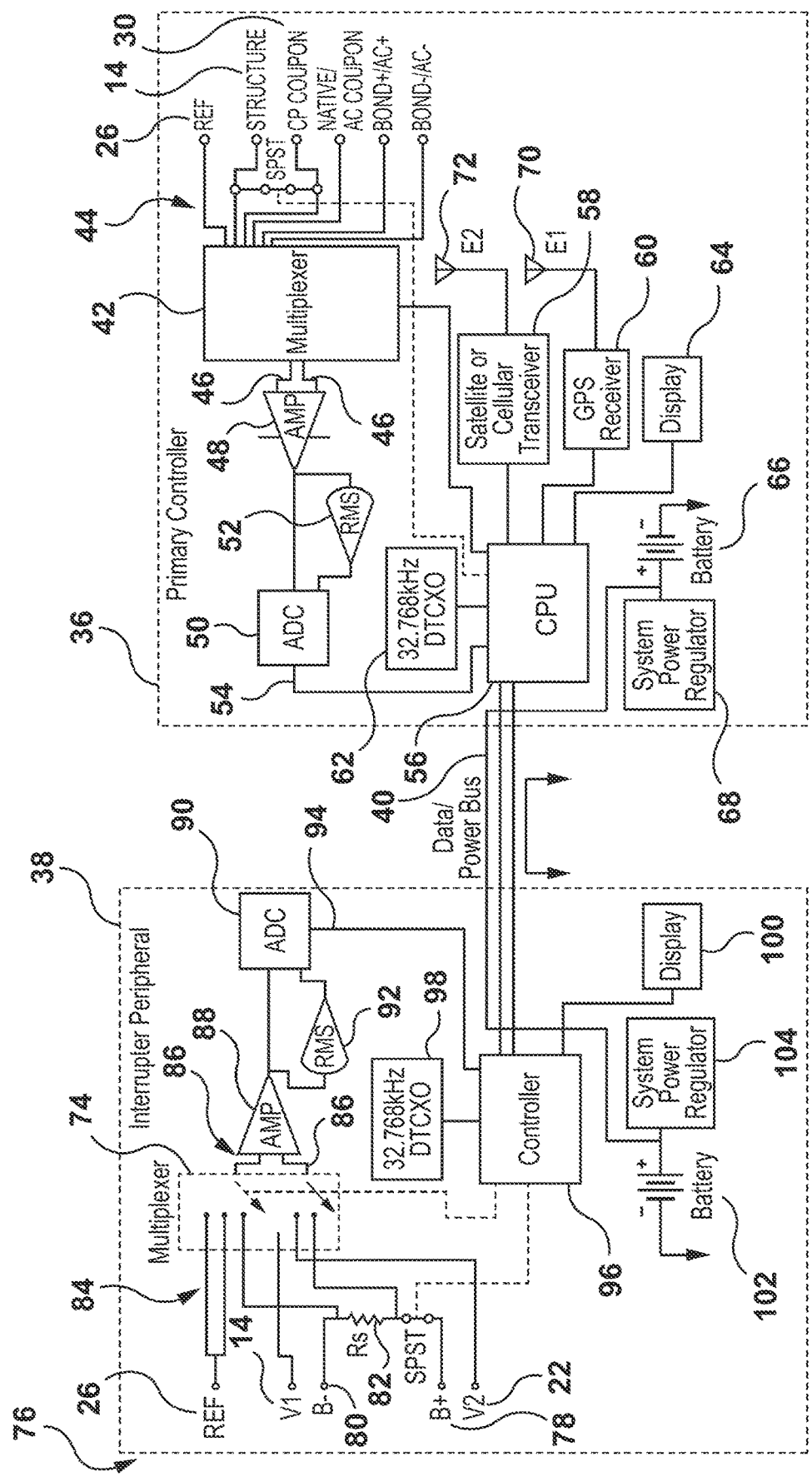
FIG. 5 illustrates the interruption module of the remote monitoring unit.

With reference to FIG. 5, there is shown the primary controller 34 of the testing unit 24 coupled with an interruption module 38, or interrupter, of remote monitoring unit 28 via a bus 40 facilitating the exchange of at least one of power and data between the interruption module 38 and the primary controller 34. The primary controller 34 of each testing unit include any number or combination of controllers, processors, circuits, integrated circuits, programmable logic devices, microcontrollers, or other suitable controlling devices and any local or external memory for storing data and other information accessed or generated by the testing unit 24.

The primary controller 34 of the testing unit 24 includes a multiplexer 42 electrically connected with the reference electrode 26, the pipeline 14, the coupon 30, a native/AC coupon, and any bonds 20 between primary structure 14 and secondary structures 22. The multiplexer 42 receives analog inputs from one or more of the aforementioned components via multiplexer input connections 44 and selects between these input signals and forwards them to output lines 46. Signals output from multiplexer 42 pass through an amplifier 48 and then to an analog-to-digital converter (ADC) 50. Signals passing from the amplifier 48 to ADC 50 may first pass through a root mean square (RMS) voltage circuit 52. RMS circuit 52 is a means for providing an AC sine wave form as an equivalent voltage which represents the corresponding DC voltage that would produce the same effect downstream. Once the analog signals are received and converted to digital signals by ADC 50, the digital signals are output via output line 54 to the central processing unit (CPU) or central controller module 56.

CPU 56 is also coupled with a transceiver 58, a GPS receiver 60, a real-time clock (RTC) 62 and a display 64. Transceiver 58 is preferably a wireless transceiver for satellite or cellular communication with other test units, or a Web server or host computer as will be described further hereinafter. GPS receiver 60 is capable of receiving information from satellites and calculating the geographic position of the testing unit 24 based on the received satellite signals. Such communication with the GPS receiver 60 is facilitated by a radio frequency antenna device 70. Real-time clock 62 may be any suitable real-time clock and is coupled with CPU 56 to control when power is provided components of the testing unit 24, or when signals are to be sent by the transceiver 58, or to synchronize with the interruption module 38 when measurements are programmed to be taken, as will be described further hereinafter. Preferably, RTC 62 is a digital temperature compensated Crystal oscillator (DTCXO), which is a type of RTC module having a crystal which oscillates at 32.768 kHz. Advantage is provided by DTCXO RTCs because they have built-in temperature compensation circuitry and also feature low power consumption. RTC 62 is preferably coupled with a second radio frequency antenna device 72. Display 64 provides for display of data received, collected or determined by operation of the testing unit 24. The primary controller 34 also includes a power source 66, such as a battery electrically coupled with a system power regulator 68.

The interruption module 38 includes a multiplexer 74 electrically connected with the reference electrode 26, primary structure or pipeline 14 and secondary structure 22, such as secondary pipeline 22. The multiplexer 74 of interruption module 38 may also be electrically connected a bond circuit 76, which may include a positive bond terminal 78, negative bond terminal 80 and a shunt resistor 82 electrically connected between the positive bond terminal 78 and the negative bond terminal 80. The multiplexer 74 receives analog inputs from one or more of the aforementioned components via multiplexer input connections 84 and selects between these input signals and forwards them to output lines 86. Signals output from multiplexer 74 pass through an amplifier 88 and then to an analog-to-digital converter (ADC) 90. Signals passing from the amplifier 88 to ADC 90 may first pass through a root mean square (RMS) voltage circuit 92. Once the analog signals are received and converted to digital signals by ADC 90, digital signals are output via the output line 94 to the central processing unit (CPU) or central controller module 96 of the interruption module 38.

CPU 96 is also coupled with a real-time clock (RTC) 98 and a display 100.

Real-time clock 98 may be any suitable real-time clock and is coupled with CPU 96 to control when power is provided components of the remote monitoring unit 28, or to synchronize with the primary controller 34 when measurements are programmed to be taken, as will be described further hereinafter. Preferably, RTC 98 is a digital temperature compensated Crystal oscillator (DTCXO). Display 100 provides for display of data received, collected or determined by operation of the remote monitoring unit 28. The interruption module 38 also includes a power source 102, such as a battery electrically coupled with a system power regulator 104.

The power source and system power regulator of the interruption module are electrically coupled with the power source 66 and system power regulator 68 of the primary controller 34 via the bus 40. Similarly, CPU is coupled unit data communication with CPU 56 of the primary controller 34 via bus 40.

When used in an arrangement wherein there is a bond circuit 76 between the primary structure 14 and secondary structure 22, the interruption module 38 typically measures the DC potential of the protected structure 14 relative to the reference electrode 26, the AC potential of the protected structure 14 relative to the reference electrode 26, the DC potential of the secondary structure 22 relative to the reference electrode 26, the AC potential of the secondary structure 22 relative to the reference electrode 26, the DC current flow between the secondary structure 22 and the protected structure 14, the AC current flow between the secondary structure 22 and the protected structure 14 and the instant disconnect potential on the protected structure 14 relative to the reference electrode 26. This last measurement is made a programmable amount of time after the interruption relay opens and the bond circuit 76 is disconnected.

Used in an arrangement wherein there is a galvanic anode 18 electrically coupled with the primary structure 14, the interruption module 38 typically measures the DC potential of the protected structure 14 relative to reference electrode 26, the AC potential of the protected structure 14 relative to the reference electrode 26, the DC potential of the galvanic anode 18 relative to the reference electrode 26, the AC potential of the galvanic anode 18 relative to the reference electrode 26, DC current flow between the galvanic anode 18 and the protected structure 14, AC current flow between the galvanic anode 18 and the protected structure 14, in the instant disconnect see potential on the protected structure 14 relative to the reference electrode 26. This last measurement is made a programmable amount of time after the interruption relay opens and the galvanic anode 18 is disconnected.

Figure 6:
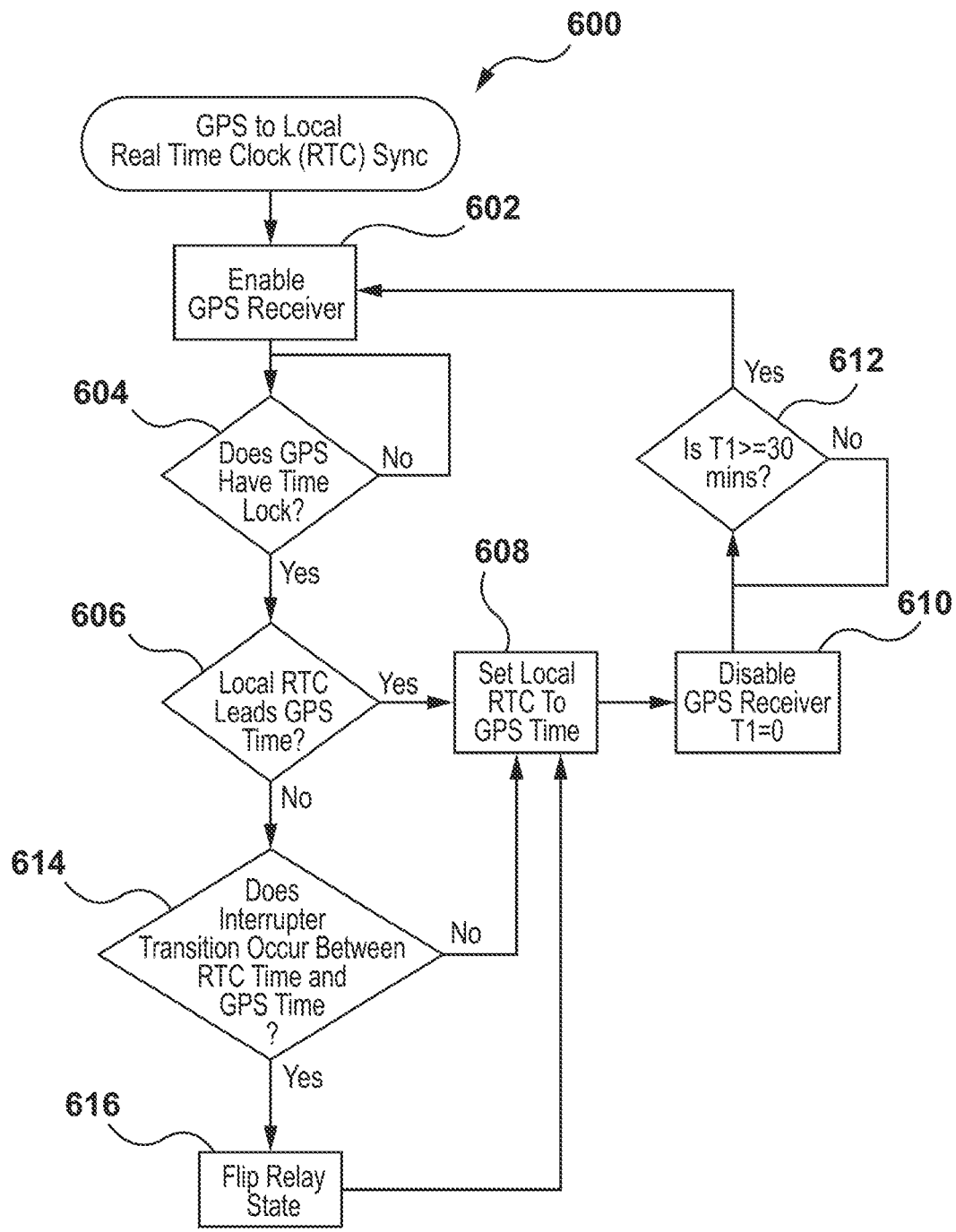
FIG. 6 illustrates a synchronization method between the GPS satellite system and the Real Time Clock of the remote monitoring unit of FIG. 5.

FIG. 6 illustrates a method 600 for synchronizing GPS to the real-time clock (RTC) 62 of the primary controller 34 of the test unit 24. The method 600 is initiated once the relay controlling the GPS synchronization switches to the "ON" state. At step 602, GPS receiver 60 is enabled. At step 604 check is performed to determine whether the GPS receiver 60 has a lock on the time. The method will cycle through this step until the GPS receiver 60 has a time lock. Once the GPS receiver 60 has a time lock, the method proceeds to step 606 where a check is performed to determine whether the local RTC 62 leads the time received by GPS receiver 60. If yes, then the local RTC 62 is set to the GPS time at step 608 and GPS receiver 60 is disabled at step 610. Once the GPS receiver 60 is disabled, a check will be cycled until 30 minutes have elapsed, as shown at step 612. Upon expiry of 30 minutes or more, the method returns to step 602 and the GPS receiver 60 is once again enabled. Returning now to step 606, where the local RTC 62 does not lead the GPS time obtained by the GPS receiver 60, the method then proceeds to step 614 whereupon a check is performed to determine whether interruption module 38 will transition to enable or disable interruption relay. If no, the method returns to step 608, where the local RTC time is set to the GPS time. If yes, the method proceeds to step 616, wherein a relay controlling the state of the interruption is flipped and the method then proceeds back to step 608 wherein the local RTC time synchronized with GPS time in step 610 wherein the GPS receiver is disabled.

Figure 7:
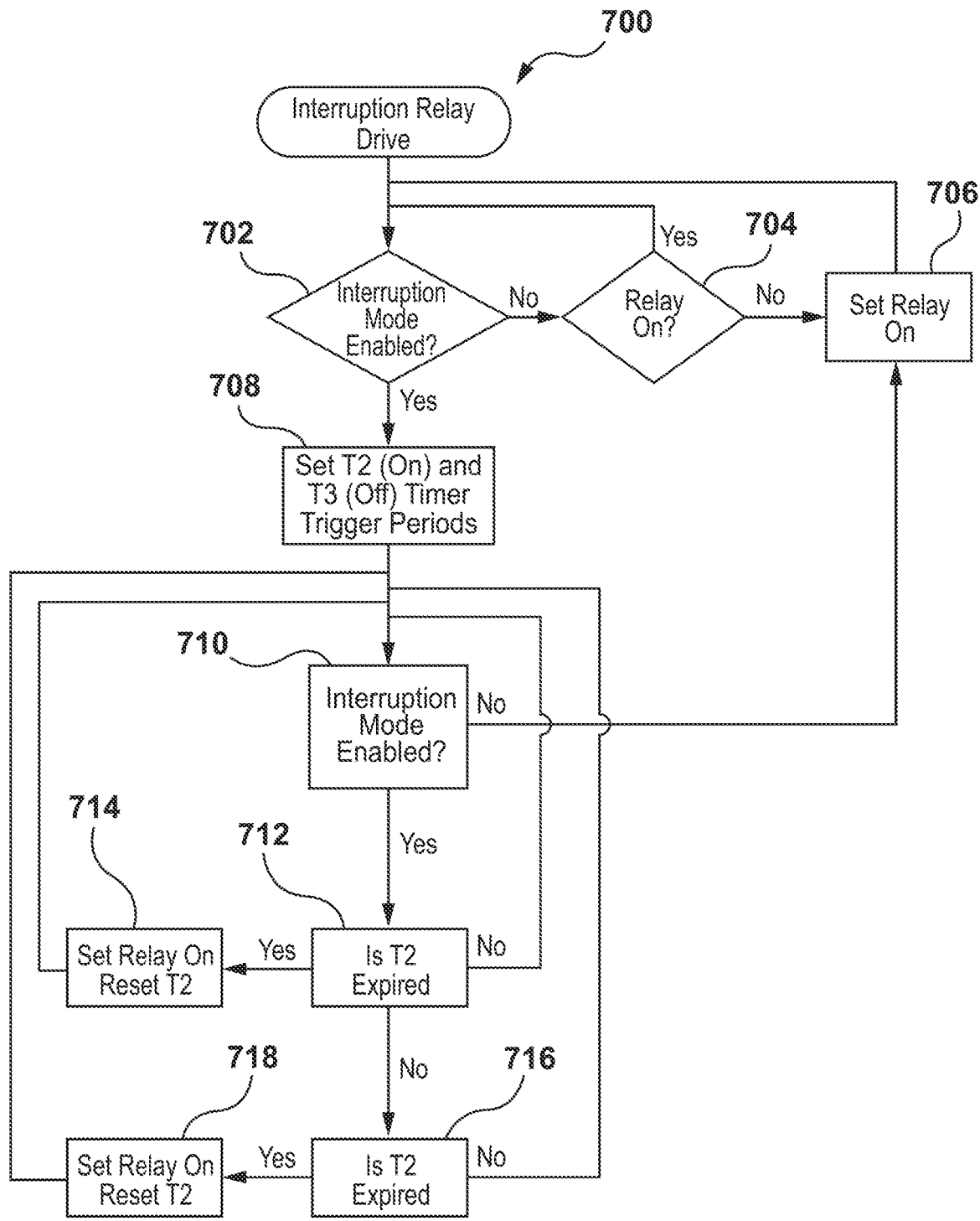
FIG. 7 illustrates the operation of the interruption module of FIG. 5.

FIG. 7 illustrates a method 700 for driving the interruption relay. The method 700 is initiated once the relay controlling the interruption drive is switched to the "ON" state. The interruption peripheral 38 will wait until a signal is received from a central controlling server or from a local control device before it will enter interruption mode, as will be described further hereinafter. Interruption mode comprises several parameters, including the following:

1. Start date/time
2. End date/time
3. On phase duration
4. Off phase duration
5. Phase at top of minute Once the signal with these parameters has been received and current date/time is between the start and end date/time, the remote monitoring unit 28 will enter interruption mode. At this point, the local real time clock (RTC) counter will be aligned to GPS time by enabling the GPS receiver 60 and waiting until a valid time is present on the GPS receiver 60. The local RTC counter is set to the received GPS time and the GPS receiver is turned off, in accordance with method 600 shown in FIG. 6.

At step 702 a check is performed to determine if the interruption mode is enabled. If interruption mode is not enabled, then the method proceeds to step 704 wherein it is determined whether the interruption relay is switched to the "ON" state. If yes, then the method returns to step 702. If no, then the method proceeds to step 706 wherein the relay is switched to the "ON" state, thereby changing the activation state of the interruption module relay. The method then returns to step 702.

While interruption mode is enabled, a waveform transition always occurs at a predetermined point in time, which in this aspect is preferably the top of the minute. The ON/OFF phase at the top of the minute is programmable through the signal from the central server or the local control device. For each duration of the on phase and the off phase, the relay that connects the protected structure to either the bond or the galvanic anode, as the case may be, is turned on or off accordingly. If the sum of on and off durations does not allow for an integer number of cycles in the period of one minute, the final phase before the top of the minute is shortened to allow a transition to occur again at the top of the minute.

This is illustrated in FIG. 7, wherein the method proceeds from step 702 to step 708 wherein the "ON" time (T2) and the "OFF" time (T3) are set. The method then proceeds to step 710 wherein a check is performed to ensure that the interruption mode is enabled. If no, then the method returns to step 706 to change the relay activation state and set the interruption relay to "ON". If yes, then the method proceeds to step 712 wherein it is determined if T2 has expired. If yes, then the method proceeds to step 714 wherein the activation state is changed and the relay is set to "ON" and T2 is reset and the method returns to step 710. If T2 has not expired, the method proceeds to step 716 it is determined if T3 has expired. If yes, then the method proceeds to step 718 wherein the activation state is changed and the interruption relay is set to "OFF" and T3 is reset and the method returns to step 710. If T3 has not expired, then the method proceeds from step 716 to step 710 directly to determine if interruption mode is enabled.

Also, while interruption mode is enabled, the GPS receiver 60 will be turned on periodically (1-30 minutes) and allowed to lock onto GPS time from the GPS satellite constellation, in accordance with method 600 shown in FIG. 6. Once lock is achieved, the local RTC counter is updated and adjustments are made to the interruption relay activation state as needed. The GPS receiver 60 is then turned off again. Keeping the GPS receiver off for most of time during the interruption mode allows significant power savings. In a preferred aspect, the period at which the GPS receiver 60 is turned on periodically is determined by the maximum allowable drift, as determined by the application, of the time in local RTC 62 relative to UTC time. Once the end date/time T3 is achieved the unit will turn the relay on and stop the interruption cycling. It should be understood that the interruption mode may also be canceled where a subsequent signal is received from the central server or the local control device cancelling the interruption mode.

As the remote monitoring unit 28 and interruption module 38 are preferably battery operated and more preferably powered only by a battery which is not connected with an external augment or power source such as grid power or solar power. Accordingly, it is advantageous to reduce the power consumption of these devices. It is therefore preferable to rely on an Iridium low Earth orbit L-band satellite system or other such low Earth orbit L-band satellite systems that may exist now or in the future. Such a system, shown in FIG. 8 enables power savings to facilitate achievement of longer battery life.

The power required to send a signal from one point to another point in a radio system is governed by the Friis transmission formula:

$$P_R = \frac{P_T G_T G_R c^2}{(4\pi R f)^2}$$

Where
$P_R$=Power received
$P_T$=Power transmitted
$G_T$=Gain of transmitting antenna
$G_R$=Gain of receiving antenna
c=Speed of light
R=Distance between transmitter and receiver antennas
f=Frequency of radio signal being transmitted It is apparent from this equation that link power loss is proportional to both distance and frequency squared. For a given signal modulation, a minimum signal level is required for the signal to be deportable by the receiver. If the gains of the antennae are maintained either or both of the frequency and distance are increased, and to maintain minimum signal level at the receiver, transmission power must be increased to compensate. Since the link power loss is proportional to the square of the distance and frequency, any increase in either parameter requires that the transmit power be substantially increased to make up the difference.

In the case of Iridium low Earth orbit L-band satellites, distance is small as compared to other satellite systems. While L-band is also used with some geostationary satellite systems, distance of the Iridium satellites is 780 km, while the distance to geostationary satellites is approximately 35,786 km. The distance is therefore 45.8 times further geostationary satellites over low-Earth orbit satellites and requires 2105 times (33.23 dB) more power to transmit to a geostationary satellite as compared to the low-Earth orbit satellite. Similarly, while other low Earth orbit satellite systems do exist, most do not use L-band. Iridium operates at approximately 1625 MHz, while other constellations operate in Ka (26.5 to 40 GHz) or Ku (12 to 18 GHz) bands. Even at the lowest frequency of Ku, 54.5 times (17.37 dB) as much power must be transmitted to make up for the loss due to the higher frequency of Ku over L-band.

While some of the link margin lost could be made up with directional antenna, several problems exist with that solution. First, the antennae will no longer fit inside a small compact product as a directional antenna requires a much larger footprint than a wide beam. Second, for geostationary satellites, precision aiming of the antenna would be required, which would make for a difficult product installation. Finally, for low Earth orbit constellations, the positions of satellites overhead are constantly changing, which would require that a beam steering mechanism be present, whether mechanical or electronic, both of which require space and power.

The Iridium low Earth orbit L-band system has both favorable parameters required for low-power operation and compact antennas. This provides for minimal distance between the ground transceiver and the satellites and low-frequency operation.

Figure 8:
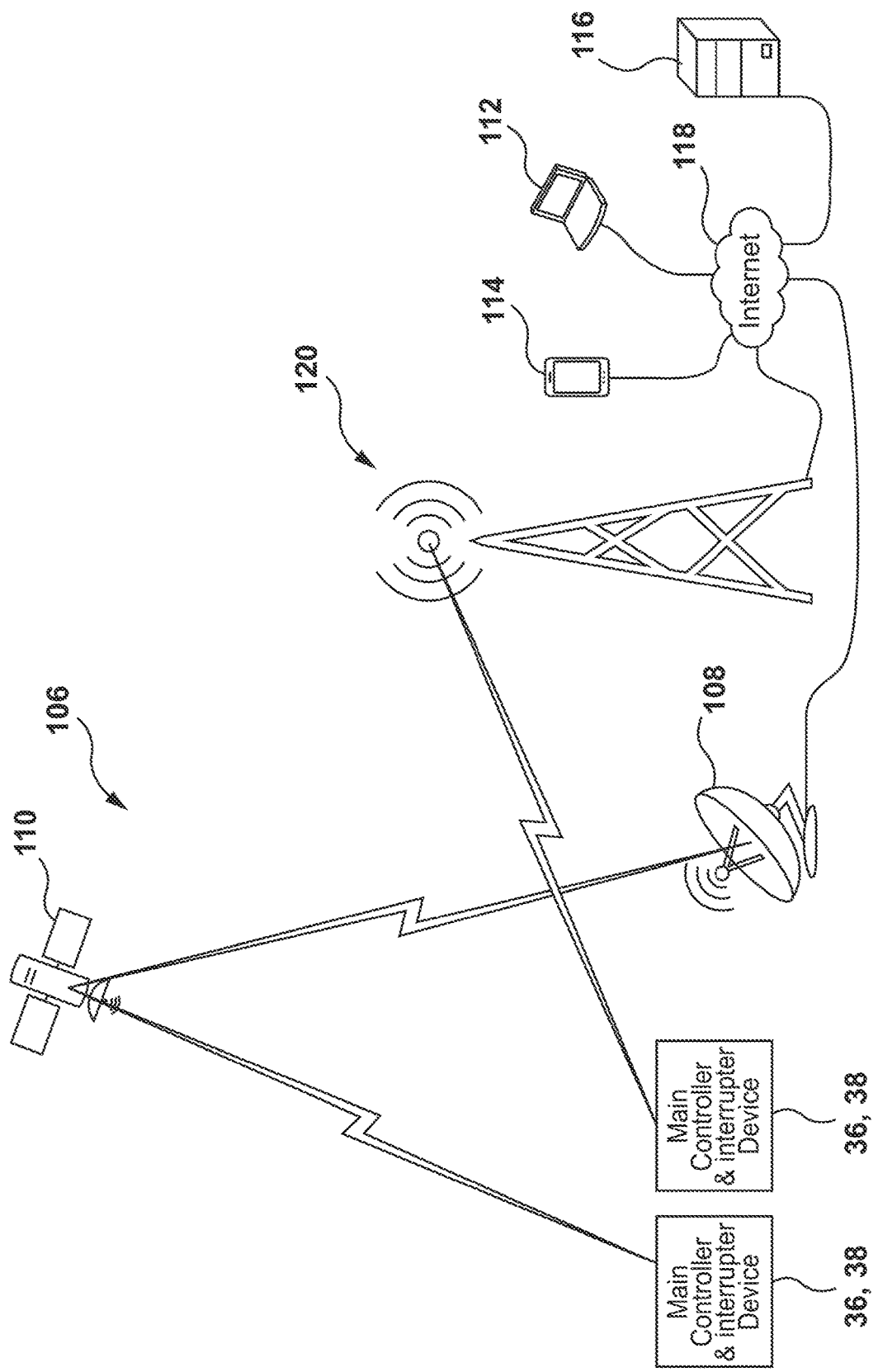
FIG. 8 illustrates communications system which may be used with embodiments of the invention; and, FIG. 9 illustrates a Global Positioning System (GPS) Satellite system for use with one embodiment of the invention.
Figure 9:
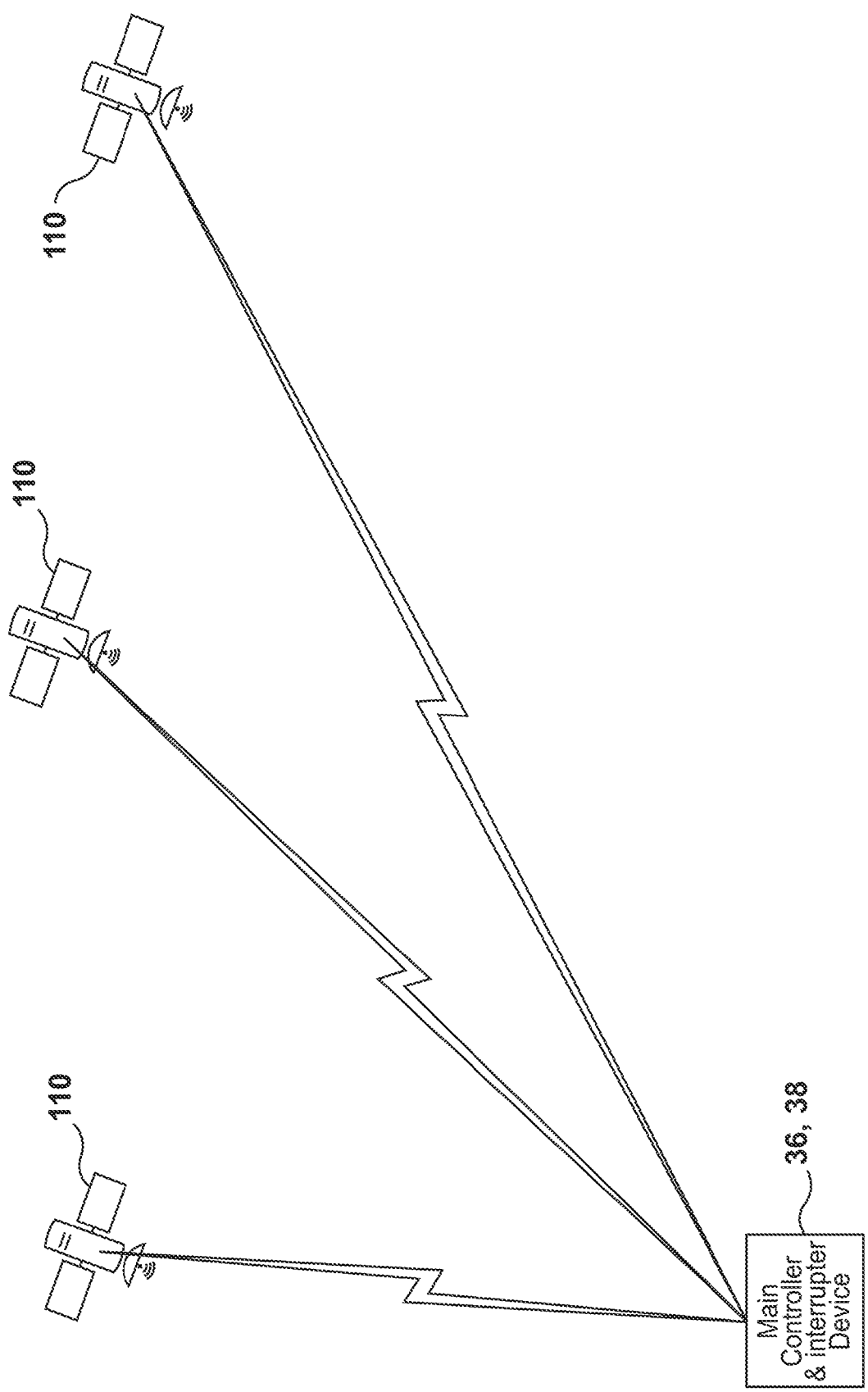

With reference to FIG. 8, there is shown a system 106 for communication between the primary controller 34 or interruption module 38 and a satellite ground station 108. In this aspect, satellite ground station 108 is capable of transmitting and receiving signals to and from satellite 110, as discussed above, satellite 110 is preferably a L-band low Earth orbit satellite which requires a signal frequency of approximately 1625 MHz. Satellite 110 is capable of transmitting and receiving signals to and from primary controller 34 and/or the interruption module 38. Satellite ground station 108 is also in communication with any suitable computer or processor, such as computer 112, any suitable mobile device 114 or any data center or server 116. Such devices may communicate with the satellite ground station 108 over any suitable network, such as the Internet 118.

In accordance with another aspect, the primary controller 34 and/or interruption device 38 may communicate with the computer 112, mobile device 114 or server 116 by way of a cellular communication system 120. The cellular communication system 120 may be connected with the devices via any suitable communication network, such as the Internet 118.

The aforementioned components and method steps, combined as described herein, provide for a low-power consumption module arrangement for the system 10. In particular, the activation of the GPS receiver 60 once the local RTC 62 reaches a predetermined real-time clock time to synchronize a real-time clock time of the local RTC 62 with GPS time reduces the amount of time over which the GPS receiver 60 is active. GPS receivers are known to consume substantial amounts of power when active for longer periods. Accordingly, activating the GPS receiver 60 only when required for synchronization of the RTC 62 with GPS time provides for substantial reduction in power demand by the system. Managing the change in activation state of the interruption modules based on the synchronized GPS time provided to the RTC 60 provides for synchronized interruption of the cathodic protection system 16 to the metallic structure 14 without the requirement for connection to line power or recharging of a local power source, such as a battery, by external means. The low-power consumption module arrangement may include any of the components or method steps as described above to provide further low-power consumption advantage to the system 10.

While the foregoing description provides what are considered to be preferred and exemplary embodiments of the present invention, other modifications of these embodiments also falling within the scope of the present invention will be apparent to those skilled in the art.

What is claimed is:

1. A method for changing an activation state of an interruption module for selectively interrupting at least one passive cathodic protection unit from a metallic structure, the method comprising the steps of:

enabling a global positioning system (GPS) receiver in data communication with a controller of the interruption module;

receiving GPS time via the GPS receiver from at least one global positioning system satellite in data communication therewith;

synchronizing a real-time clock time of a real-time clock in data communication with the controller to GPS time;

disabling the GPS receiver; and changing the activation state of the interruption module if a predetermined activation state change time of the interruption module is between the local real-time clock time and the GPS time to selectively electrically couple or electrically decouple the at least one passive cathodic protection unit from the metallic structure.

2. The method according to claim 1 wherein the step of disabling the GPS receiver further comprises disabling the GPS receiver for a predetermined time period.

3. The method according to claim 2 further comprising the step of: enabling the GPS receiver upon expiry of the predetermined time period.

4. The method according to claim 1, wherein the step of synchronizing the real-time clock with GPS time further comprises synchronizing the real-time clock with GPS time when the real-time clock leads GPS time.

5. The method according to claim 2, wherein the predetermined activation state change time is a predetermined activation time and the interruption module is activated at the step of changing the activation state.

6. The method according to claim 1, wherein the predetermined activation state change time is a predetermined de-activation time and the interruption module is de-activated at the step of changing the activation state.

7. The method according to claim 1, wherein prior to the step of receiving GPS time via the GPS receiver, the method further comprises the step of:

establishing a data communication lock between the GPS receiver and the at least one global positioning system satellite.

8. The method according to claim 1, wherein the metallic structure is one of a pipeline, a marine structure, a storage tank, a bridge, a power line tower, an electrical grid infrastructure component and a coupon.

9. The method according to claim 8, wherein the metallic structure is a coupon which is embedded in an electrolytic medium adjacent the pipeline and electrically coupled with the passive cathodic protection unit via a switch electrically coupled between the coupon and the test station for selectively coupling and decoupling the at least one coupon from the passive cathodic protection unit.

* * * * *